(12) United States Patent
Lupash

(10) Patent No.: US 6,515,618 B1
(45) Date of Patent: Feb. 4, 2003

(54) FAULT DETECTION AND EXCLUSION IN A POSITIONING SYSTEM RECEIVER

(75) Inventor: Lawrence O. Lupash, Sunnyvale, CA (US)

(73) Assignee: Trimble Navigation Ltd., Sunnyvale, CA (US)

(*) Notice: Subject to any disclaimer, the term of this patent is extended or adjusted under 35 U.S.C. 154(b) by 0 days.

(21) Appl. No.: 09/726,994

(22) Filed: Nov. 29, 2000

(51) Int. Cl.[7] .................................................. G01S 5/14

(52) U.S. Cl. ........................ 342/357.02; 342/357.12; 701/214

(58) Field of Search ....................... 342/357.12, 357.02; 701/214

(56) References Cited

U.S. PATENT DOCUMENTS

| | | | |
|---|---|---|---|
| 5,202,829 A | 4/1993 | Geier | |
| 5,317,514 A | 5/1994 | Bancroft et al. | |
| 5,317,544 A | 5/1994 | Maas et al. | |
| 5,436,632 A | 7/1995 | Sheynblat | |
| 5,512,903 A | 4/1996 | Schmidtke | |
| 5,623,414 A | 4/1997 | Misra | |
| 5,760,737 A | 6/1998 | Brenner | |
| 5,808,581 A | 9/1998 | Braisted et al. | |
| 5,841,399 A | * 11/1998 | Yu ........................ | 342/357.02 |
| 6,204,806 B1 | * 3/2001 | Hoech ................... | 342/357.02 |
| 6,205,377 B1 | 3/2001 | Lupash et al. | |
| 6,281,836 B1 | 8/2001 | Lupash et al. | |
| 6,311,127 B1 | * 10/2001 | Stratton et al. ............. | 701/213 |

OTHER PUBLICATIONS

Van Dyke, Karen. "The World After SA: Benefits to GPS Integrity", IEEE Plans 2000, 3/2000, pp. 387–394.*
Langley, Richard B. "The Integrity of GPS", http://www.gpsworld.com/069910699innov. 10 pages, 6/99.*
Pervan, Boris S. et al. "Parity Space Methods for Autonomous Fault Detection and Exclusion using GPS Carrier Phase", IEEE PLANS 1996, pp. 649–656.*
Virbell, V. Glenn et al. "GPS Integrity Channel Based Fault Detection and Exclusion Algorithm Using Maximum Solution Separation", IEEE Plans 1994, pp. 747–754.*

(List continued on next page.)

Primary Examiner—Gregory C. Issing
(74) Attorney, Agent, or Firm—Blakely Sokoloff Taylor & Zafman LLP (57) ABSTRACT

A multi-stage process for detecting and excluding faulty measurements in a satellite positioning system receiver are described. Availability of fault detection is evaluated based on satellite geometry and satellite measurement quality. If fault detection is unavailable using only satellite measurements, an additional measurement is used, and fault detection availability is again evaluated. If fault detection is available, detection of a potential fault is performed. If a fault is detected, an exclusion/isolation process is activated. In that case, a fault exclusion operation is tested for availability. If fault exclusion is unavailable using only satellite measurements, an additional measurement is incorporated, and fault exclusion availability is again evaluated. If fault exclusion is available, an attempt is made to isolate and exclude the faulty measurement from a list of satellite measurements used for the navigation solution. The exclusion/isolation process is performed in several stages based on the elimination of the faulty satellite.

39 Claims, 8 Drawing Sheets

OTHER PUBLICATIONS

Brown, R. Grover, Receiver Autonomous integrity Monitoring, Global Positioning System.

Theory and Applications, vol. II, AIAA vol. 164, pp. 143–165, 1996.

Lee, Young C., Example Fault Detection and Exclusion Algorithm, RTCA PAper No. 595–95/SC159–683, pp. 1–7.

Brown, R. Grover, and Chin, Gerald Y. GPS RAIM: Calculation of Threshold and Protection Radius.

Using Chi–Square Methods—A Geometric Approach, Navigation, The Institute of Navigation, vol. 5, pp. 155–178, 1998.

Anonymous, Minimum Operational Performance Standards for Global Positioning System/Wide Area.

Augmentation System Airborne Equipment, RTCA/DO–229A, Washington D.C., Jun. 8, 1998, pp. 2–17.

* cited by examiner

FAULT DETECTION AND EXCLUSION IN A POSITIONING SYSTEM RECEIVER

FIELD OF THE INVENTION

The present invention pertains to satellite positioning system receivers, such as Global Positioning System (GPS) receivers. More particularly, the present invention relates to detecting that a particular satellite has provided a faulty measurement and then excluding the faulty measurement from further position solution activity.

BACKGROUND OF THE INVENTION

Satellite positioning systems are well known for enabling users to precisely locate their positions on or near the Earth. Such systems are commonly used for navigation in many different applications, such as aviation, nautical travel, automobile travel, etc. One well-known satellite positioning system is the Global Positioning System (GPS). The GPS was developed by the United States Department of Defense under its NAVSTAR satellite program. The fully operational GPS includes 24 satellites dispersed approximately uniformly around six circular orbits with four satellites in each orbit. Three or more GPS satellites should be visible from most points on the earth's surface, and access to three or more such satellites can be used to determine an observer's position anywhere near the earth's surface at all times. Each satellite carries atomic clocks to provide timing information for the signals transmitted by the satellites. Internal clock correction is provided for each satellite clock.

Four satellites at a minimum are needed to uniquely determine a user's position in three dimensions and time. If only three satellites are visible, conventional GPS software solves for latitude, longitude and time. Time is nearly always necessary to be ascertained, and the altitude dimension can be constrained, e.g., assumed or provided.

Each GPS satellite transmits two spread-spectrum, L-band carrier signals. The "L1" signal has a frequency of 1575.42 MHz, and the "L2" signal has a frequency of 1227.6 MHz. These two frequencies are integral multiples of a base frequency of 1.023 MHz. The L1 signal from each satellite is binary phase shift key (BPSK) modulated by two pseudo-random noise (PRN) codes in phase quadrature, i.e., a coarse acquisition (C/A) code and a precision (P) code. The L2 signal from each satellite is BPSK modulated by only the P code.

Use of the PRN codes in a code multiple access scheme allows the sorting out of the GPS satellite signals that all share the same L1 and L2 frequencies. A signal transmitted by a particular GPS satellite is selected in a GPS receiver by generating and matching, or correlating, the corresponding, unique PRN code for that particular satellite. The PRN codes come from a short list, and each is stored in GPS receivers carried by ground observers.

The P-code is a relatively long, fine-grained code having an associated clock or "chip" rate of 10.23 MHz. The C/A-code allows rapid satellite signal acquisition and hand-over to the P-code and is a relatively short, coarser grained code, having a chip rate of 1.023 MHz. The C/A-code for any GPS satellite has a length of 1023 chips and thus repeats every millisecond. The full P-code has a length of 259 days, with each satellite transmitting a unique portion of the full P-code. The portion of P-code used for a given GPS satellite has a length of precisely one week (7.000 days) before this code portion repeats.

The GPS system is such that the C/A-code and P-code can be deliberately corrupted in one operational mode by random dithering that reduces position-fix accuracy. This mode is called Selective Availability (SA). A mode called Anti-Spoofing (AS) includes the transmission of an encrypted Y-code in place of the P-code. "Authorized" receivers can decode the Y-code, and such receivers can retain their accuracy in position fix determination during SA.

The GPS satellite bit stream includes navigational information on the ephemeris of the transmitting GPS satellite and an almanac for all GPS satellites, with additional parameters providing corrections for ionospheric signal propagation delays suitable for single frequency receivers and for an offset time between satellite clock time and true GPS time.

Another satellite positioning system is the Global Navigation Satellite System (GLONASS), placed in orbit by the former Soviet Union and now maintained by the Russian Federation. GLONASS also uses 24 satellites, distributed approximately uniformly in three orbital planes of eight satellites each. The methods for receiving and analyzing GLONASS signals for determining a user's position are similar to those used for GPS.

Yet another satellite positioning system is the Galileo system, which is a satellite positioning system next to be introduced by European countries.

One problem associated with satellite positioning systems such as GPS, GLONASS and Galileo, is that an anomaly can occur in the signal transmitted from a satellite or in a measurement derived from a satellite signal in the receiver. The anomaly may be due to, for example, a problem within the satellite, a problem within the receiver, or interference in the signal path between the satellite in the receiver. Regardless of the cause of the problem, such an anomaly can result in an erroneous navigation solution in the receiver. Such an error can be intolerable in many applications, such as an aircraft landing assistance system, in which even a small error in the navigation solution can be critical. Therefore, some provision must be made to detect and exclude faulty measurements from the navigation solution, as they occur.

Certain GPS receivers are equipped with a Receiver Autonomous Integrity Monitoring (RAIM) system which performs this function. However, certain existing RAIM solutions are capable of handling only a limited number (e.g., eight) of satellite measurements for purposes of detecting and excluding faults. In addition, existing RAIM systems do not provide a high enough probability of isolating and excluding a fault for many applications and do not meet the stringent time to alarm requirements for non-precision approach and category I through category III landing. For example, the Federal Aviation Administration (FAA) requires a probability of exclusion of 0.999 or even higher for aircraft navigation. Note that existing GPS receivers generally attempt to detect and exclude a faulty measurement in a single combined step. This can result in the failure to isolate a faulty measurement or the incorrect exclusion of a non-faulty measurement, particularly for small errors. The reason for this is that the faulty measurement is not always the top candidate for exclusion.

SUMMARY OF THE INVENTION

The present invention includes a positioning system receiver capable of detecting and excluding a fault and a technique for carrying out such processes. The technique includes determining whether a fault detection operation is available, and attempting to detect a fault while the fault detection operation is available. The technique also includes determining whether a fault exclusion operation is available in response to a fault being detected, and attempting to exclude the fault if the fault exclusion operation is available.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for detecting and excluding a faulty measurement in a GPS receiver are described. Note that in this description, references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated, and except as will be readily apparent to those skilled in the art. Thus, the present invention can include any variety of combinations and/or integrations of the embodiments described herein.

The integrity monitoring technique described herein is able to satisfy more stringent requirements for probability of isolation and exclusion than prior art techniques, without the associated limitations in the number of measurements it can handle. The integrity monitoring technique, which is described in greater detail below, can be summarized as follows, according to one embodiment. First, fault detection availability is assessed based on satellite geometry and the quality of satellite measurements. The criteria used to determine fault detection availability can be selected based on the desired navigation solution quality, such as whether the Horizontal Protection Level (HPL) or Vertical Protection Level (VPL) is less than or equal to a specified value. If fault detection is not available by using only satellite measurements, then an additional measurement is incorporated, and the fault detection availability test is repeated. If fault detection is available, the next operation is the detection of a potential fault; otherwise fault detection is declared to be currently unavailable. If a fault is detected, the exclusion/isolation process is activated. More specifically, the fault exclusion process is first tested for availability based on a selectable criterion similar to that used in the fault detection process. If fault exclusion is determined to be unavailable by using only satellite measurements, then an additional measurement is incorporated, and the fault exclusion availability test is repeated. If fault exclusion is available, then an attempt is made to isolate and exclude the faulty satellite measurement from the list of satellite measurements used in the computation of the navigation solution. The exclusion/isolation process is performed in several stages, based on the elimination of the faulty satellite. A delay scheme may be incorporated to take advantage of the quality of the exclusion test statistics.

Figure 1:
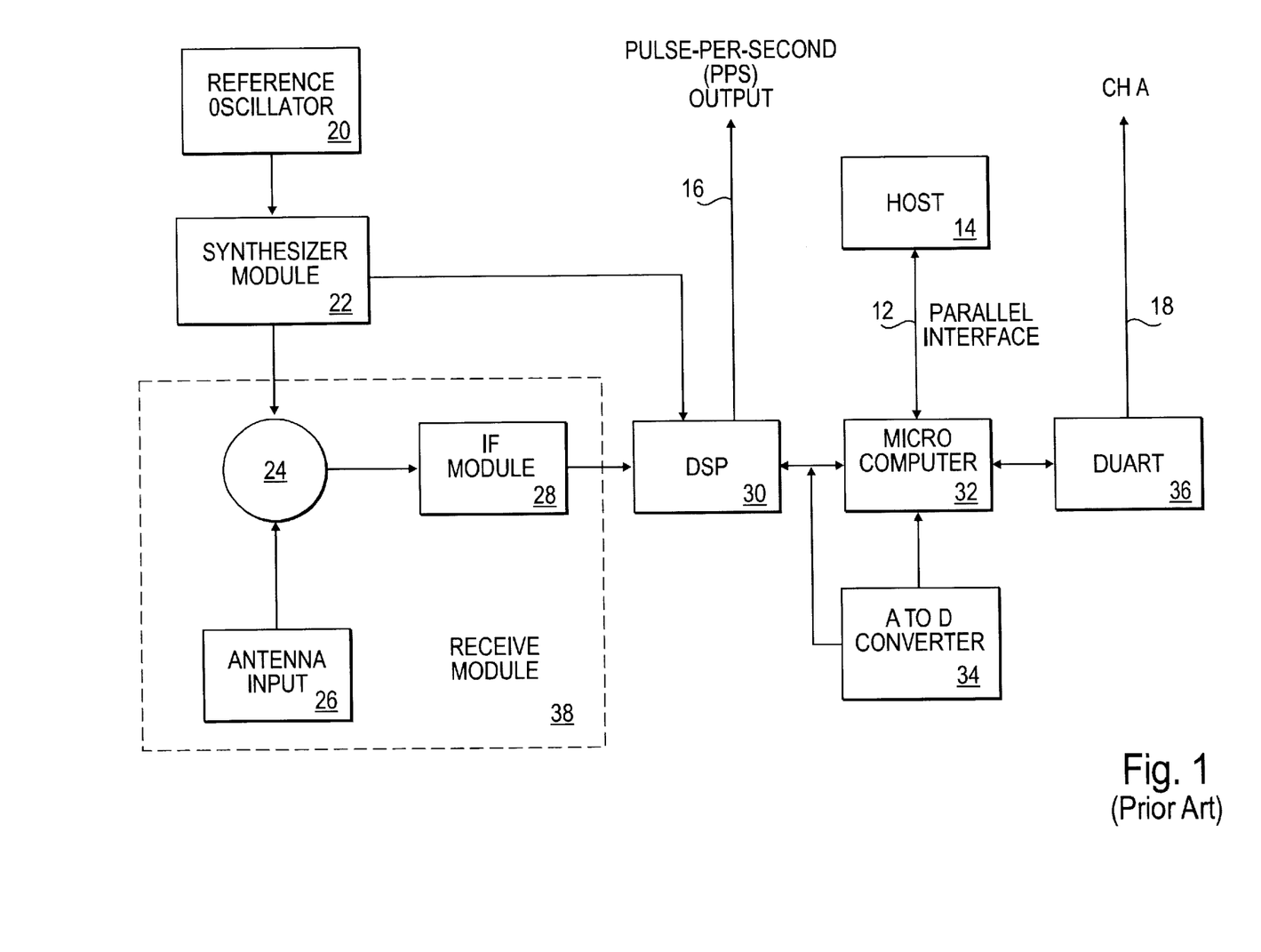
FIG. 1 is a high-level block diagram of a GPS receiver in which the integrity monitoring (fault detection and exclusion) process of the present invention can be implemented.

FIG. 1 illustrates a multi-channel GPS receiver 10, in which the integrity monitoring technique of the present invention can be implemented. Note, however, that the present invention is not limited to application with GPS. For example, the techniques described herein can also be applied to other types of satellite positioning systems, such as GLONASS. Also, note that the techniques described herein are not necessarily limited to implementation in the receiver configuration shown in FIG. 1.

The primary function of the GPS receiver 10 is to provide accurate navigation data, e.g., position and velocity, to a host processor 14 of a navigation system. Accordingly, the illustrated GPS receiver 10 includes hardware and software needed for satellite signal processing and position/velocity solution computations. The GPS receiver 10 has a number of processing channels operating on the L1 frequency using the C/A code. The GPS receiver 10 has a bi-directional parallel bus interface 12 to a host 14, a one-microsecond-duration Pulse-Per-Second (PPS) output 16 and a serial channel 18. The GPS receiver 10 also includes a reference oscillator 20, a frequency synthesizer module 22, and a receive module 38. The receive module 38 includes a mixer 24, an antenna input 26 to receive signals from orbiting satellites, and an intermediate frequency (IF) module 28 for downconversion. The GPS receiver 10 also includes a Digital Signal Processor (DSP) 30 that decodes and demodulates the channels of satellite signals, a microcomputer 32 that computes position and velocity from the decoded and demodulated signals, an analog-to-digital converter (ADC) 34, and a Dual Universal Asynchronous Receiver/Transmitter (DUART) 36.

The GPS receiver 10 receives satellite signals through the antenna input 26 that are filtered and fed to the mixer 24 and are downconverted and fed to the IF module 28. A local oscillator signal for the mixer 24 is provided by the synthesizer module 22, which receives its master timing reference from a temperature-compensated crystal oscillator, i.e., reference oscillator 20. The synthesizer module 22 also produces several frequencies used by the DSP 30 and the microcomputer 32. The IF module 28 processes the IF signal, amplifying it and limiting its bandwidth. The resulting signal is fed to the DSP 30.

The DSP 30 includes hardware for tracking multiple channels of GPS signals and for extracting carrier and code information and a data subcarrier. The microcomputer 32 controls the operation of the tracking functions performed by the DSP 30. Measurements and data are collected to compute position and velocity solutions in the microcomputer 32. The selection of which satellites will be tracked is controlled, and the orbital information data and almanac for all of the satellites is managed, by microcomputer 32. The microcomputer 32 may be, or may include, one or more conventional general-purpose or special-purpose programmable microprocessors, application-specific integrated circuits (ASICs), field programmable gate arrays (FPGAs), programmable logic arrays (PGAs), or the like, or a combination of such devices.

The ADC 34 allows the GPS receiver 10 to monitor the status of a primary power supply (not shown), the synthesizer module 22, a back-up battery (not shown), an antenna power supply feed (not shown), and the internal temperature of the receiver 10. The GPS receiver 10 communicates with the host 14 over the parallel bus 12, and it may also communicate with external devices using the DUART 36 via the bidirectional serial data port 18.

The DSP 30 not only includes hardware and software for tracking the GPS signals and extracting carrier and code information, but it also provides a millisecond timing interrupt. Software is used to control the operation of the tracking hardware in the DSP 30. In turn, the DSP 30 provides GPS signal information to the microcomputer 32.

The PPS output 16 is controlled by the DSP 30. A one microsecond pulse generated each second is controlled by a multi-bit programmable delay, specified in 1.023 MHz clock cycles. Software is used to determine a bias from GPS system time during a position solution. The PPS delay is stored prior to the 999th millisecond of a GPS second. The GPS receiver 10 software also sets the PPS output flag during processing of the 998th millisecond of each GPS second, and clears it for all other millisecond periods. During normal navigation, the onset of the PPS will be within two microseconds of the so-called "UTC" second.

The integrity monitoring process of the present invention may be implemented in software used to program a processing device, such as the microcomputer 32. That is, the process is performed by the processing device executing the software. The software may be stored in a memory (not shown) within the microcomputer 32 or elsewhere within the GPS receiver 10. Alternatively, the integrity monitoring process can be implemented using only hardwired circuitry, or a combination of hardwired circuitry and a programmed processor (e.g. microcomputer 32). Hence, the integrity monitoring process of the present invention is not limited to any particular combination of hardware and/or software.

Figure 2:
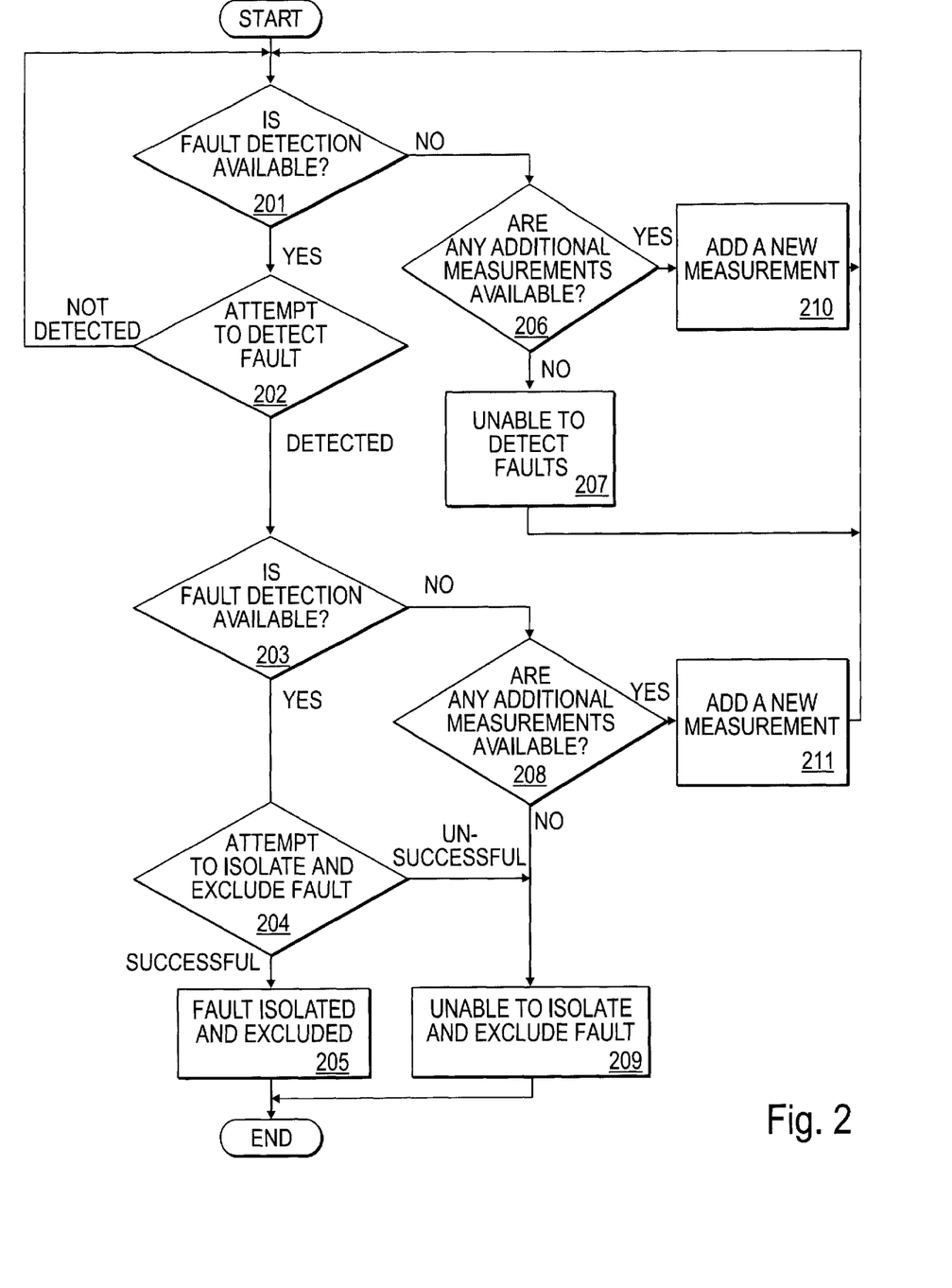
FIG. 2 is a flow diagram showing the overall integrity monitoring process.

FIG. 2 shows the overall integrity monitoring process of the present invention, according to one embodiment. This process is performed in parallel with the normal positioning measurements and computations performed by the receiver. Initially, a fault detection process is performed (201, 202, 206, 207 and 210), followed by a fault isolation/exclusion process (203, 204, 205, 208, 209 and 211) when a fault is detected. More specifically, it is initially determined at 201 whether fault detection is available. By "available", what is meant is that fault detection can be performed with sufficient reliability, i.e., with sufficiently low probability of missed detection (pmd) and probability of false alarm (pfa). The manner in which this determination is made is described in greater detail below. If fault detection is not available, then if any additional measurements are available (206), a new measurement is added to the navigation solution determination, and the process repeats from 201 with another determination of whether fault detection is available. The new measurement is added by adding a new row to the observation matrix, H, corresponding to the new measurement.

The new measurement might be, for example, a barometric measurement; a clock signal; a carrier phase based measurement; a measurement from distance measurement equipment (DME) or an inertial navigation system (INS); or a measurement from another positioning system such as GLONASS, Galileo, or LORAN-C. In addition, it is assumed herein that all available satellite measurements are used. If that is not the case, then the first additional measurement to be chosen would be an available satellite measurement that has not yet been used. It will be recognized that other types of additional measurements can also be used in this way.

If no additional measurements are available (206), then at 207 it is determined that the receiver is currently unable to detect a faulty measurement, and the process repeats from 201.

If it is determined at 201 that fault detection is available, then at 202 fault detection is attempted. If no fault is detected at 202, the process repeats from 201. If the fault is detected, the fault isolation/exclusion process is initiated. Specifically, at 203 it is determined whether fault exclusion is available. By "available", what is meant is that fault exclusion can be performed with sufficient reliability, i.e., with sufficiently low probability of missed exclusion (pme) and probability of false exclusion (pfe). The manner in which this determination is made is described in detail below. The situation in which fault exclusion is not available is handled in a manner similar to the situation in which fault detection is not available. That is, if an additional measurement is available (208), then a new measurement is added to the navigation solution determination at 211, and the process then repeats from 201 with another determination of whether fault detection is available. If no additional measurements are available, it is determined at 209 that the receiver is currently unable to isolate and exclude the fault.

If it was determined at 203 that fault exclusion is available, then an attempt is made to isolate and exclude default at 204. The manner in which faults isolation and exclusion is performed is described in detail below. If the attempt to successful, the faulty measurement is isolated and excluded at 205. Otherwise, it is determined at 209 that receiver is currently unable to isolate and exclude the fault.

In one embodiment, the above process may be implemented in the form of a "background task" and a "foreground task". The background task includes the determinations of fault detection availability and fault exclusion availability. These determinations are made at a particular frequency (the "background rate"), such as 1/60 Hz (once per minute). The foreground task includes the actual fault detection and fault isolation/exclusion, which are performed at another frequency (the "foreground rate") that is higher than the first frequency, such as 1 Hz. Hence, in one implementation, fault detection is attempted once every second as long as fault detection is available (as determined by the last availability test), and fault detection availability is evaluated once per minute. Similarly, fault exclusion availability may be assessed once per minute, and fault exclusion is attempted when a fault is detected.

In one embodiment, a delay scheme is also employed to take advantage of the quality of the exclusion test statistics. To avoid initiating fault exclusion in response to an insignificant, transient anomaly, a delay may be inserted between the first instance of a fault being detected and initiation of the fault exclusion availability test and exclusion process. For example, it may be required that a fault be detected for a certain number of consecutive cycles (or some minimum number of non-consecutive cycles within a given time interval) before making a conclusive determination a fault exists so as to trigger the fault exclusion availability testing and exclusion process. The number of times a fault would need to be detected would depend upon the current mode of use of the receiver, such as the phase of flight (e.g., en route or terminal approach) for an aeronautical application. This approach reduces the likelihood that a harmless transient will erroneously trigger the fault exclusion process.

Note that several parameters which are used in the integrity monitoring process must be computed "offline" prior to executing the process. These parameters made then be stored in the positioning system receiver database prior to field operation, for subsequent use in real-time integrity monitoring. The parameters include the normalized fault detection threshold $T_D$, the normalized fault exclusion threshold $T_E$, and the normalized fault detection/exclusion availability multiplier $\lambda_B$. Of course, it is also possible to modify these parameters during normal operation of the receiver ("online"), such as in response to operator selection or automatically, upon transitioning from one mission phase to another or when a new mission is selected.

Figure 3:
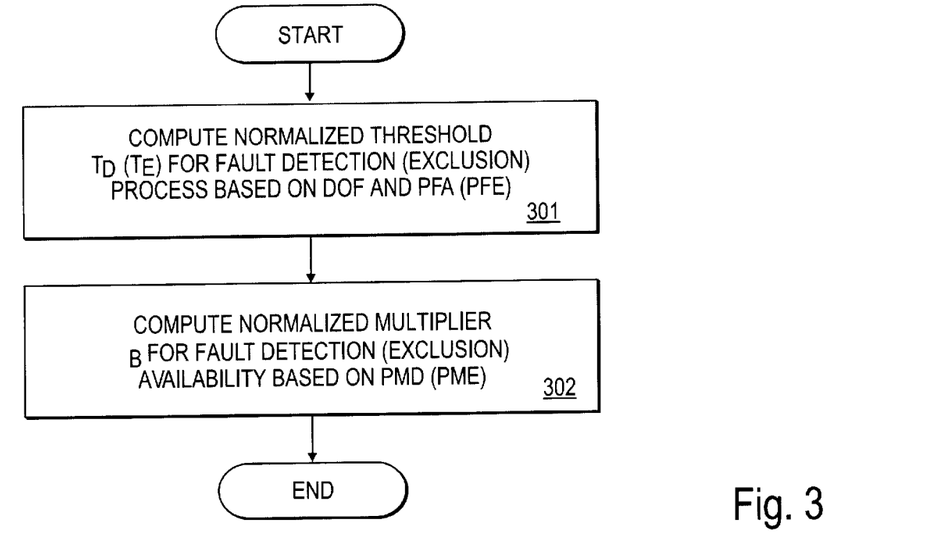
FIG. 3 is a flow diagram illustrating an off-line process for computing various parameters used in real-time integrity monitoring.

FIG. 3 shows the procedure for computing these parameters, according to one embodiment. Initially, at 301 the normalized fault detection threshold $T_D$ is computed based on the degree of freedom (dof) and the desired pfa. The dof is the number of measurements n minus four (i.e., n−4). Also at 301, the normalized fault exclusion threshold $T_E$ is computed based on the dof and the desired pfe. One suitable technique for computing a fault detection threshold and a fault exclusion threshold is described in R. G. Brown and G. Y. Chin, "GPS RAIM: Calculation of Threshold and Protection Radius Using Chi-Square Methods—A Geometric Approach," Navigation, vol. 5, pp. 155–78, Institute of Navigation, 1998 ("Brown et al."), which is incorporated herein by reference. In one embodiment of the integrity monitoring process described herein, if dof=1 a Gaussian distribution is used for the pseudorange error, while if dof>1 a Chi-square distribution is used for pseudorange error.

Next, at 302 the normalized multiplier $\lambda_B$ is computed for fault detection based on the desired pmd, and for fault exclusion based on the desired pme. Reference may also be made to Brown et al. for purposes of this computation.

Figure 4:
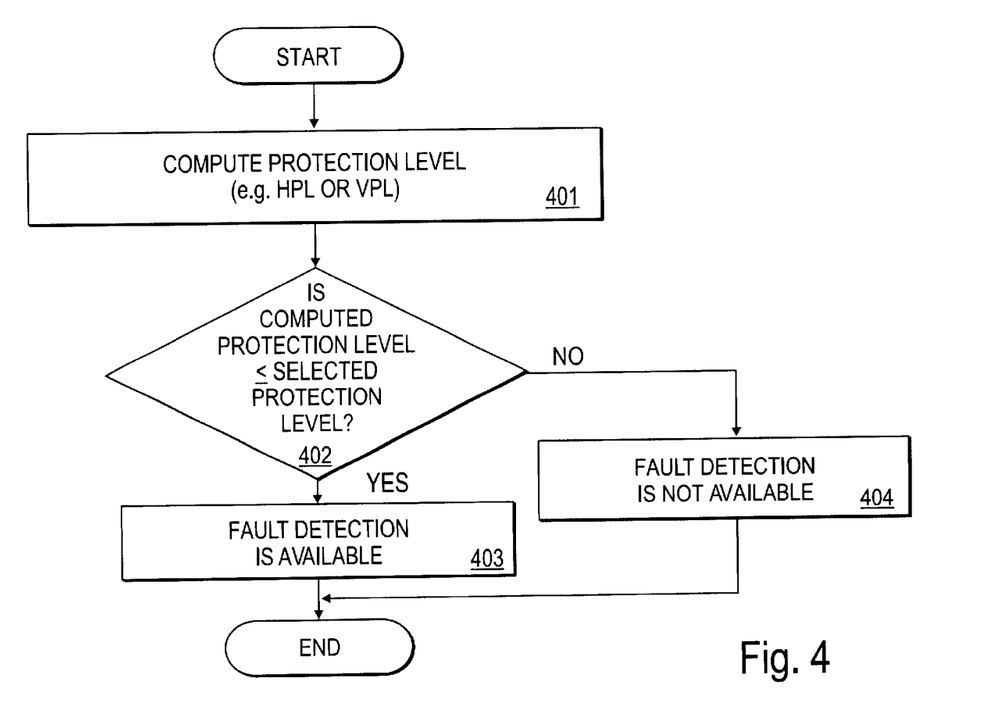
FIG. 4 is a flow diagram showing a process for determining fault detection availability.

The fault detection availability determination (201 in FIG. 2) will now be described in greater detail, according to one embodiment, with reference to FIG. 4. Initially, at 401 a criterion value is computed. In the context of aviation, for example, the computed criterion value may be a HPL or a VPL (defined above), whichever is appropriate. The particular parameter that is used as the criterion value may depend upon the current phase of flight or imposed constraints of the current mission. For example, for aircraft landing, vertical precision may be more important than horizontal, whereas for oceanic applications, horizontal separation may be more important.

The values HPL and VPL are distance values, which are compared against a selected protection level (also a distance value) to determine fault detection availability. The selected protection level may be specified by government regulation. For example, the FAA specifies a Vertical Alert Level (VAL) for different phases of flight in aviation (e.g., en route, terminal) and an Horizontal Alert Level (HAL) for oceanic applications and for the different phases of flight in aviation. The values HAL and VAL may be used as the selected protection levels for comparison to HPL and VPL, respectively. The FAA specifies an HAL of 0.3 nautical miles for non-precision aircraft approach, one nautical mile for terminal flight, two nautical miles for en route flight, and four nautical miles for oceanic applications. Similarly, the FAA also specifies VALs for these different contexts.

Thus, at 402 it is determined whether the computed protection level is less than or equal to the selected protection level (e.g., whether HPL≦HAL). If that is true, it is determined at 403 that fault detection is available. Otherwise, it is determined at 404 that fault detection is not available.

Figure 5:
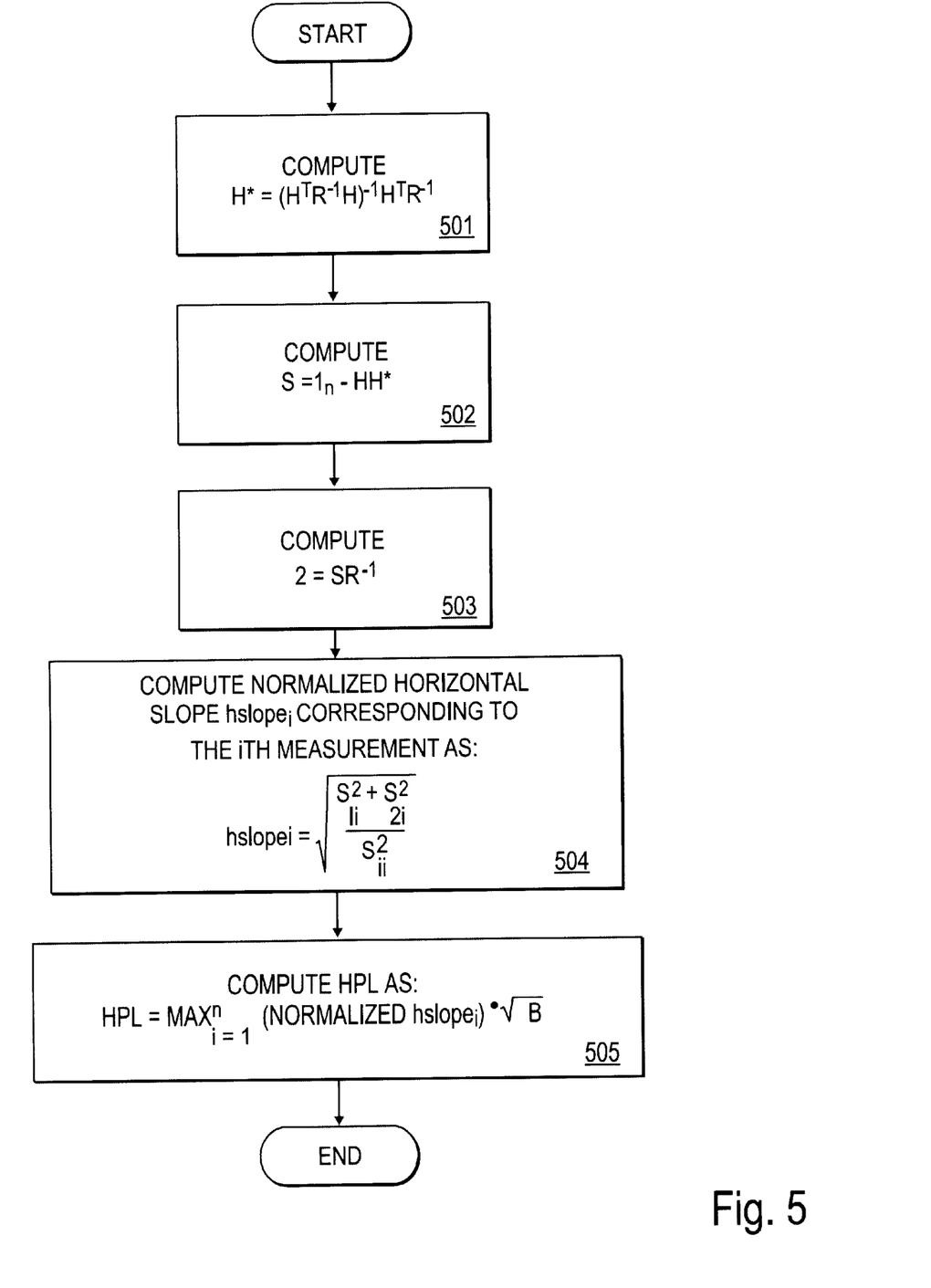
FIG. 5 is a flow diagram illustrating a process for computing a Horizontal Protection Level (HPL)

The manner of computing an HPL and a VPL (401 in FIG. 4) is described now in greater detail, according to one embodiment, with reference to FIG. 5. First, however, it is useful to define certain parameters. The observation matrix H represents the linear connection matrix between the vector containing the user state vector and the vector containing the changes in the measurements. The observation matrix H is usually an n×4 matrix, where n is the number of measurements. The quantity W represents the weighting matrix, which is also defined as the quantity $R^{-1}$, as set forth in equation (1), where $\lambda_B$ represents the real-time (or a priori) estimated standard deviation of the error in the ith measurement (if the measurements are independent).

Referring now to FIG. 5, at 501 the matrix H* is computed according to equation (2) (where "H*" represents the pseudo inverse or generalized inverse of matrix H and "$H^T$" represents the transpose of matrix H). At 502, the matrix S is computed according to equation (3), where I represents the unit matrix of dimension n. At 503, the transformation matrix $\tilde{S}$ is computed according to equation (4). At 504, the normalized horizontal slope $hslope_i$ is computed according to equation (5). At 505, the HPL is computed according to equation (6).

$$R^{-1} = \mathrm{diag}\left(\frac{1}{\sigma_i^2}\right) = W \tag{1}$$

$$H^* = (H^T R^{-1} H)^{-1} H^T R^{-1} \tag{2}$$

$$S = I_n - HH^* \tag{3}$$

$$\tilde{S} = SR^{-1} \tag{4}$$

$$hslope_i = \sqrt{\frac{S_{1i}^2 + S_{2i}^2}{\tilde{S}_{ii}^2}} \quad (i = 1 \text{ to } n) \tag{5}$$

$$HPL = \max_{i=1}^{n}(normalized\ hslope_i) \cdot \sqrt{\lambda_B} \tag{6}$$

The VPL can be computed in a similar manner to the HPL, except that the horizontal slope $hslope_i$ is replaced by the vertical slope $vslope_i$ in the computation, where $vslope_i$ is defined according to equation (7). VPL is computed according to equation (8).

$$vslope_i = \sqrt{\frac{A_{3i}^2}{\tilde{S}_{ii}}} \tag{7}$$

$$VPL = \max_{i=1}^{n}(normalized\ vslope_i) \cdot \sqrt{\lambda_B} \tag{8}$$

Figure 6:
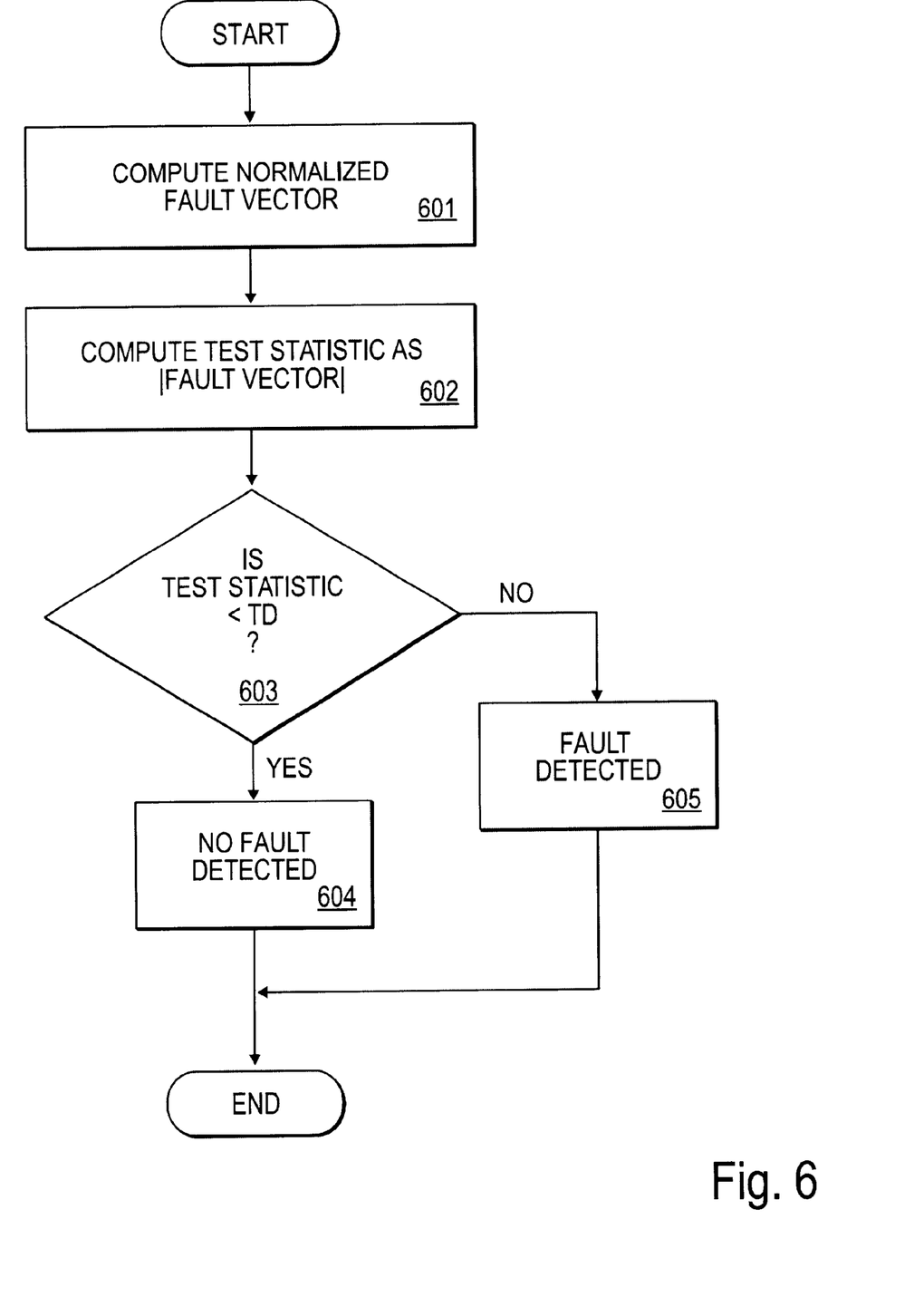
FIG. 6 is a flow diagram showing a fault detection process.

The process of attempting to detect a fault (202 in FIG. 2) will now be described in greater detail, according to one embodiment, with reference to FIG. 6. This process is performed only if fault detection was determined to be available at 201. Initially, at 601 the normalized fault vector f is computed according to equation (9), where y is an n×1 vector containing the changes in the measurements.

$$f = W \cdot [I - (H^T W^T W H)^{-1} H^T W^T W] \cdot y \tag{9}$$

At 602, a test statistic is computed as the magnitude of the normalized fault vector f. At 603, it is determined whether the test statistic is less than the normalized fault detection threshold $T_D$. If so, it is determined that no fault has been detected at 604. Otherwise, is determined that a fault has been detected at 605. In response to determining that fault has been detected at 605, fault exclusion availability may be performed immediately. Alternatively, as described above, it may be required to have multiple consecutive (or closely-spaced in time) fault detections before triggering fault exclusion availability testing.

Figure 7:
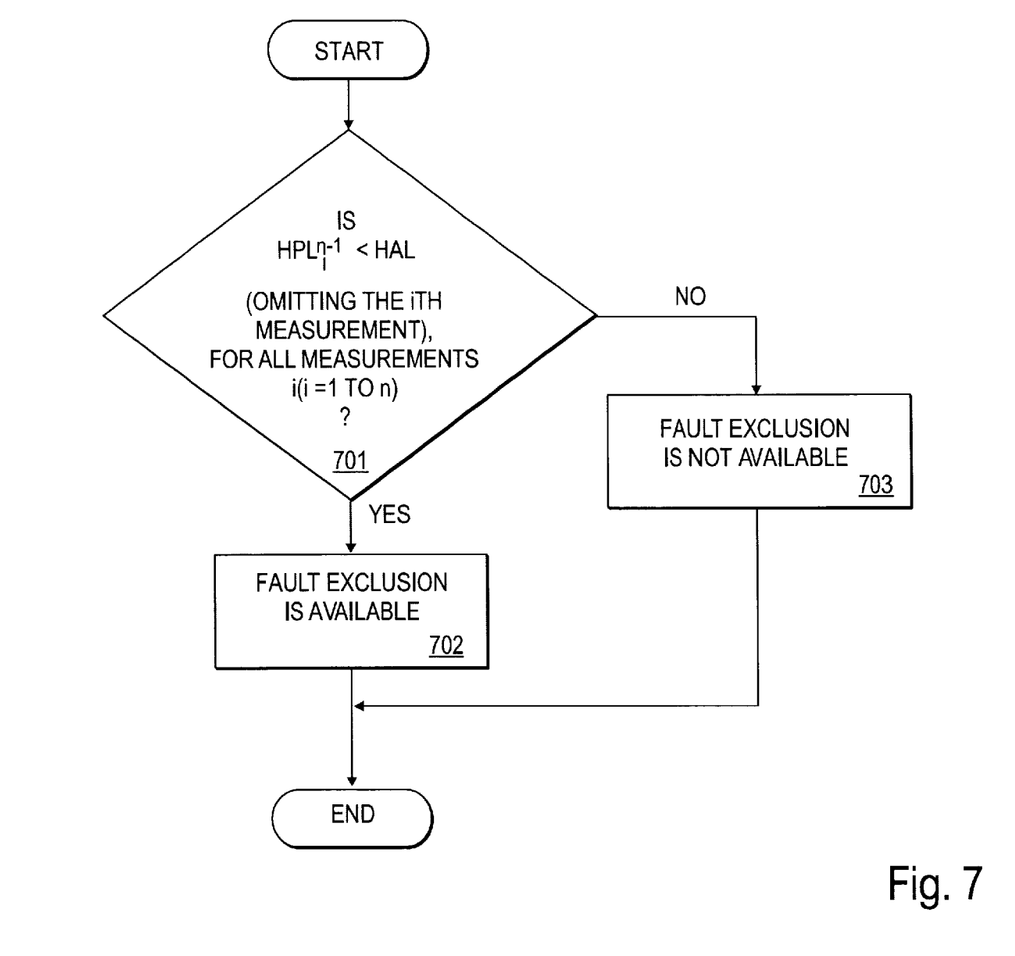
FIG. 7 is a flow diagram illustrating a process for determining fault exclusion availability.

The process of determining whether fault exclusion is available (203 in FIG. 2) will now be described in greater detail, according to one embodiment, with reference to FIG. 7. At 701, for each of n cases (where n is the number of measurements), it is determined whether the computed criterion value is less than the selected protection level (for example, whether HPL<HAL, as shown in FIG. 7), where a different one of the n measurements is omitted in each case. If this condition holds true for all n cases, then it is determined that fault exclusion is available at 702. Otherwise, it is determined at 703 that fault exclusion is not available.

The process of attempting to isolate and exclude a fault (204 in FIG. 2) will now be described in greater detail, according to one embodiment. This process is performed only if fault exclusion was determined to be available. The exclusion process essentially includes the same test used to detect a fault, however it is performed for n different cases, with a different measurement omitted from the test in each case. A subset of the cases in which the test statistic is less than the normalized fault exclusion threshold $T_E$ is then selected, and the measurements associated with those selected cases are used to populate a fault exclusion list. The subset is selected based on the corresponding computed protection levels (e.g., the HPLs), each having a different measurement omitted. Those measurements with the lowest computed protection levels (with one measurement omitted) are then used to again attempt to detect a fault, in the manner described above. If a fault is no longer detected with a given measurement omitted, it is concluded that the omitted measurement is the faulty measurement. If a fault is still detected, the test is repeated with a different measurement (from the fault exclusion list) omitted, until a fault is no longer detected. If the entire fault exclusion list is tested but a fault is detected in each case, it is concluded that fault isolation/exclusion is not possible. Note that it is also possible to recompute the fault exclusion list after a few cycles with unsuccessful exclusion. However, the associated logic is likely to be more complex as implemented in real-time software, for example.

Figures 8, 8A:
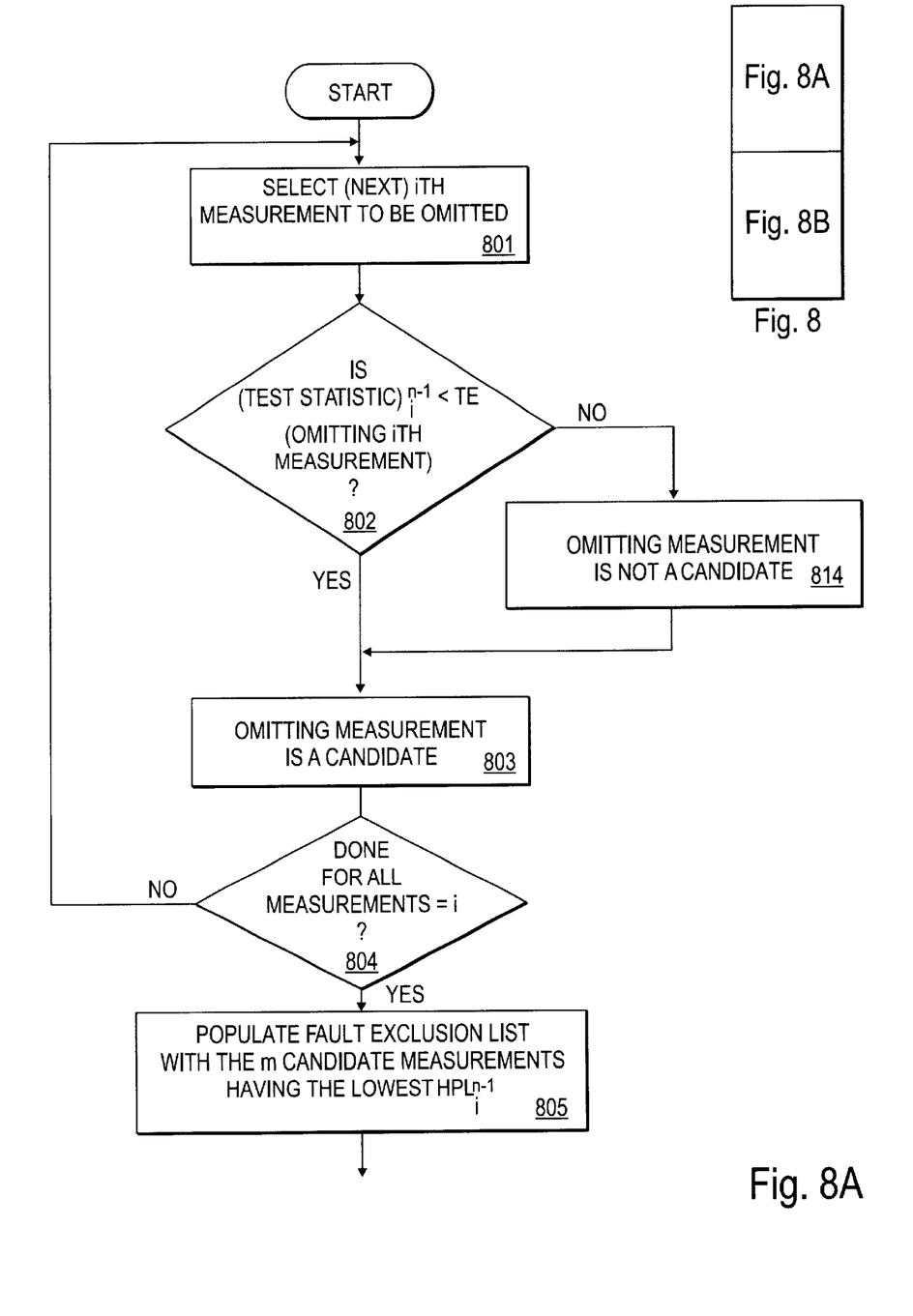
FIG. 8 is a flow diagram showing a fault exclusion process.
Figure 8B:
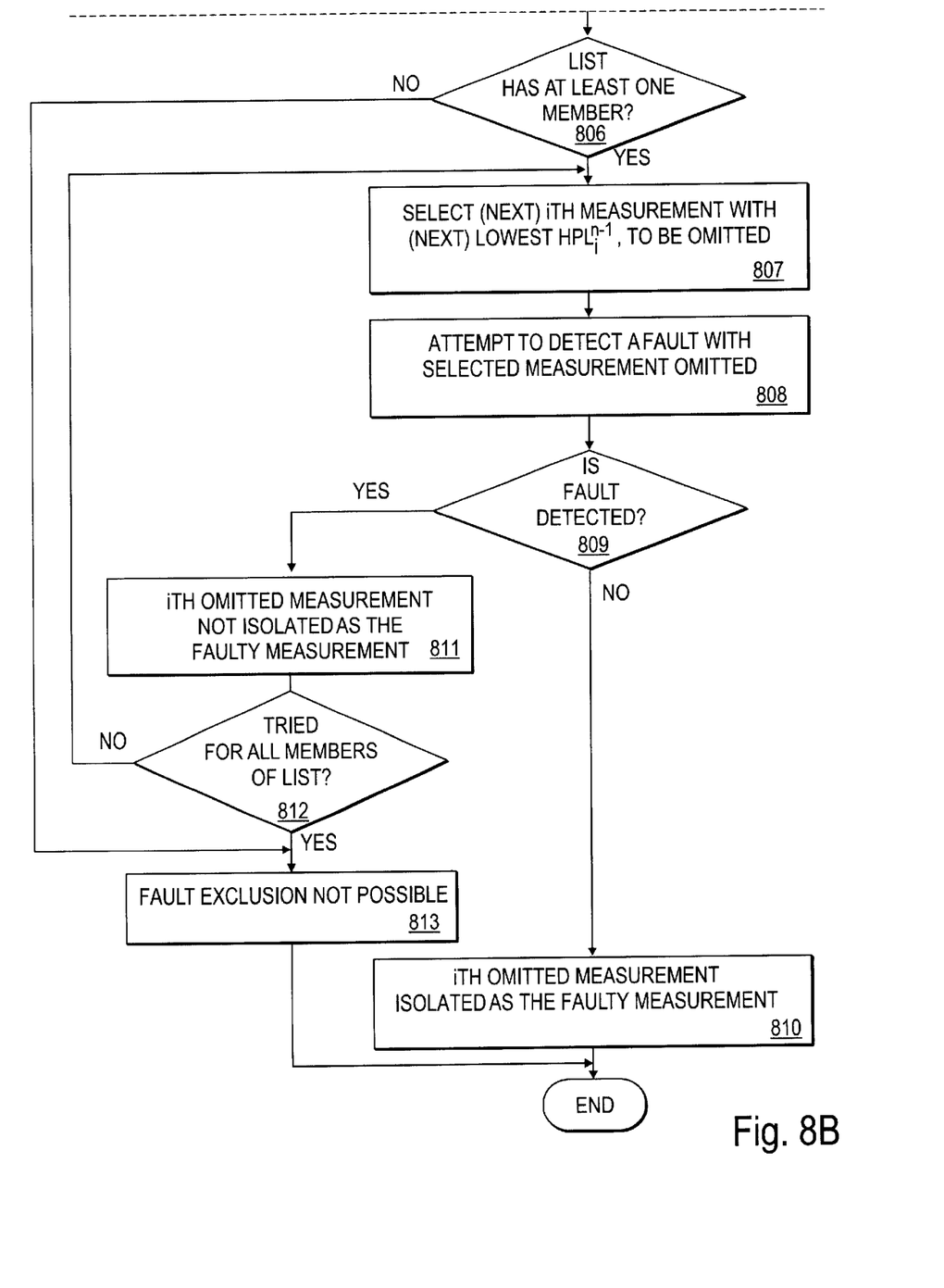

This fault isolation/exclusion process is illustrated in FIG. 8, as now described. Initially, at 801 the ith measurement is selected to be omitted, where i is an index value. At 802, it is determined whether the test statistic (computed as described above, but with the ith measurement omitted) is less than the normalized fault exclusion threshold $T_E$. If so, the omitted (ith) measurement is determined to be a "candidate" at 803; otherwise, the omitted measurement is determined not to be a candidate at 814. Following 803 or 814, if the test (802) has not been performed for every possible case of a different measurement being omitted (804), then the process repeats from 801 with the selection of the next measurement to be omitted (i.e., the index i is incremented).

Otherwise, at 805 a subset of those measurements found to be "candidates" (803) are used to populate a fault exclusion list. Specifically, a number m of the candidate measurements are used to populate the fault exclusion list, where m is a predetermined integer that is based on any of various criteria, such as the desired level of performance and/or the current phase of flight. For example, the fault exclusion list might include the four measurements (m=4) with the lowest HPLs for a particular phase of flight. The number m will usually be four if the multi-stage exclusion process has a maximum of four stages.

Assuming the fault exclusion list has at least one member (806), the measurement in the list having the lowest computed protection level (e.g., HPL) with one measurement omitted is selected at 807, and an attempt to detect a fault is then made at 808 (in the manner described above) with the selected measurement omitted. If the list was empty (806), then at 813 it is determined that fault exclusion is not possible. If no fault is detected (809), then at 810 the currently selected measurement in the fault exclusion list is identified as the faulty measurement and is excluded from future positioning computations.

On the other hand, if a fault is detected (809), then it is determined at 811 that the currently selected (omitted) measurement is not the faulty measurement. Accordingly, if fault detection has been attempted with each member of the fault exclusion list omitted (812), then it is determined at 813 that fault exclusion is not possible. If fault detection has not yet been attempted for every case in which a member of the list is omitted, then fault detection is again attempted (808), omitting the measurement in the list (807) with the next-lowest HPL (or other computed protection level), until all members of the list have been tested. Note that the maximum number of attempts may alternatively be based on the time to alarm for the specific application (e.g., the phase of flight).

Thus, a method and apparatus for detecting and excluding a faulty measurement in a GPS receiver have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method in a positioning system receiver of detecting and excluding a fault, the method comprising:

determining whether a fault detection operation is available, including periodically testing whether the fault detection operation is available at a first rate;

attempting to detect a fault while the fault detection operation is available, including periodically attempting to detect a fault at a second rate higher than the first rate;

determining whether a fault exclusion operation is available in response to a fault being detected; and attempting to exclude the fault if the fault exclusion operation is available.

2. A method as recited in claim 1, wherein the positioning system receiver is used in an aircraft, the method further comprising:

in response to detection of a fault and prior to said determining whether the fault exclusion operation is available, attempting to confirm the fault by attempting to detect the fault at least one additional time, according to a current phase of flight of the aircraft.

3. A method as recited in claim 1, wherein the fault is in one of a set of measurements used by the receiver to compute a position, the method further comprising:

if the fault detection operation is not available, adding a new measurement to the set of measurements; and repeating said determining whether the fault detection operation is available.

4. A method as recited in claim 3, wherein said determining whether the fault detection operation is available is based on the set of measurements.

5. A method as recited in claim 3, wherein the set of measurements comprises a plurality of satellite measurements.

6. A method as recited in claim 5, wherein the new measurement is not a satellite measurement.

7. A method as recited in claim 1, wherein the fault is in one of a set of measurements used by the receiver to compute a position, the method further comprising:

if the fault exclusion operation is not available, adding a new measurement to the set of measurements; and repeating said determining whether the fault exclusion operation is available.

8. A method as recited in claim 7, wherein said determining whether the fault exclusion operation is available is based on the set of measurements.

9. A method as recited in claim 8, wherein the set of measurements comprises a plurality of satellite measurements.

10. A method as recited in claim 9, wherein the new measurement is not a satellite measurement.

11. A method as recited in claim 1, wherein the fault is in one of a set of measurements used by the receiver to compute a position, the method further comprising, if either the fault detection operation or the fault exclusion operation is not available, adding a new measurement to the set of measurements.

12. A method as recited in claim 11, wherein said determining whether the fault detection operation is available and said determining whether the fault exclusion operation is available are both based on the set of measurements.

13. A method as recited in claim 12, wherein the set of measurements comprises a plurality of satellite measurements.

14. A method as recited in claim 13, wherein the new measurement is not a satellite measurement.

15. A method of detecting and excluding a faulty measurement in a positioning system receiver, the method comprising:

performing a fault detection process, the fault detection process including
periodically determining whether a fault detection operation is available at a first rate, and
if the fault detection operation is available, periodically attempting to detect a fault at a second rate higher than the first rate; and performing a fault exclusion process, the fault exclusion process including
determining whether a fault exclusion operation is available in response to a fault being detected, and
attempting to exclude the fault if the fault exclusion operation is available.

16. A method as recited in claim 15, further comprising, if fault detection is not available, adding a new measurement to the set of measurements and then repeating said determining whether the fault detection operation is available, wherein the new measurement is not a satellite measurement.

17. A method as recited in claim 15, further comprising, if the fault exclusion operation is not available, adding a new measurement to the set of measurements and then repeating said determining whether the fault exclusion operation is available, wherein the new measurement is not a satellite measurement.

18. A method as recited in claim 15, further comprising if either fault detection or the fault exclusion operation is not available, adding a new measurement to the set of measurements, wherein the new measurement is not a satellite measurement.

19. A method as recited in claim 15, wherein said determining whether the fault exclusion operation is available is performed at a rate equal to or approximately equal to the first rate.

20. A method of detecting and excluding a faulty satellite measurement in a satellite positioning system receiver, the method comprising:

determining at a first rate whether a fault detection operation is available based on a set of n measurements, the set of n measurements including a plurality of satellite measurements;

if the fault detection operation is available, attempting to detect a fault associated with one of the satellite measurements, at a second rate higher than the first rate;

if the fault detection operation is not available, adding a new measurement to the set of measurements and then repeating said determining whether the fault detection operation is available, wherein the new measurement is not a satellite measurement;

in response to detecting a fault, waiting for a delay period and then repeating said attempting to detect a fault; and in response to a fault being detected a predetermined number of times within a defined period of time,
determining whether a fault exclusion operation is available at a rate equal to or approximately equal to the first rate,
if the fault exclusion operation is available, attempting to exclude the fault, and
if the fault exclusion operation is not available, adding a new measurement to the set of measurements and then repeating said determining whether the fault exclusion operation is available, wherein the new measurement is not a satellite measurement.

21. A method as recited in claim 20, wherein said determining whether the fault detection operation is available comprises:

computing a protection level; and determining that the fault detection operation is available if the computed protection level has a predetermined relationship to a specified protection level.

22. A method as recited in claim 20, wherein said determining whether the fault exclusion operation is available comprises:

computing a protection level for each of n cases, wherein a different one of the n measurements is omitted in each case;

determining that the fault exclusion operation is available only if the computed protection level has a predetermined relationship to a specified protection level for each of the n cases.

23. A method as recited in claim 22, wherein said performing the fault exclusion operation comprises:

for each of the n cases, computing a test statistic and comparing the test statistic with a threshold to test for a predetermined condition;

ranking the measurements for only the cases in which the predetermined condition exists, based on the computed protection level for each of the measurements;

attempting to detect a fault, omitting one of the measurements based on said ranking;

if a fault is detected, repeating said attempting to detect a fault, omitting a different one of the measurements based on said ranking; and if a fault is not detected, identifying the omitted measurement as the faulty satellite measurement.

24. A method of detecting and excluding a faulty satellite measurement in a satellite positioning system receiver, the method comprising:
(a) determining, at a first rate, whether a fault detection operation is available based on a set of n measurements, the set of n measurements including the plurality of satellite measurements, including
  (a)(1) computing a protection level, and
  (a)(2) determining that the fault detection operation is available if the computed protection level has a predetermined relationship to a specified protection level;
(b) if the fault detection operation is available, attempting to detect a fault associated with one of the satellite measurements, at a second rate higher than the first rate;
(c) if the fault detection operation is not available, adding a new measurement to the set of measurements and then repeating said determining whether the fault detection operation is available, wherein the new measurement is not a satellite measurement;
(d) in response to detecting a fault, waiting for a delay period and then repeating said attempting to detect a fault; and
(e) in response to a fault being detected a predetermined number of times within a period of time,
  (e)(1) determining, at a rate equal to or approximately equal to the first rate, whether a fault exclusion operation is available, including
    computing a protection level for each of n cases, wherein a different one of the n measurements is omitted in each case, and
    determining that the fault exclusion operation is available only if the computed protection level has a predetermined relationship to a specified protection level for all of the n cases;
  (e)(2) if the fault exclusion operation is not available, adding a new measurement to the set of measurements and then repeating said determining whether the fault exclusion operation is available, wherein the new measurement is not a satellite measurement; and
  (e)(3) if the fault exclusion operation is available, attempting to exclude the fault, including
    for each of the n cases, computing a test statistic and comparing the test statistic with a threshold to test for a predetermined condition,
    ranking the measurements for only the cases in which the predetermined condition exists, based on the computed protection levels,
    attempting to detect a fault, omitting one of the measurements based on said ranking,
    if a fault is detected, determining that the omitted measurement is not the faulty satellite measurement and repeating said attempting to detect a fault, omitting a different one of the measurements based on said ranking, and
    if a fault is not detected, identifying the omitted measurement as the faulty satellite measurement.

25. A satellite positioning system receiver comprising:
a receive module to receive and process signals from a plurality of satellites; and
a processor coupled to the receive module and configured to
  generate a plurality of measurements based on the processed signals, the measurements for use in computing a navigational solution, and
  execute a fault detection and exclusion routine to detect and exclude a fault in one of the measurements, the routine including
    determining whether a fault detection operation is available, including periodically testing whether the fault detection operation is available at a background rate;
    attempting to detect a fault while the fault detection operation is available, including periodically attempting to detect a fault at a foreground rate higher than the background rate;
    determining whether a fault exclusion operation is available in response to a fault being detected; and
    attempting to exclude the fault if the fault exclusion operation is available.

26. A satellite positioning system receiver as recited in claim 25, wherein the receiver is for use in an aircraft, wherein the processor is further configured to:
in response to detection of a fault and prior to determining whether the fault exclusion operation is available, attempt to confirm the fault by attempting to detect the fault at least one additional time, according to a current phase of flight of the aircraft.

27. A satellite positioning system receiver as recited in claim 25, wherein the fault is in one of a set of measurements used by the receiver to compute a position, the method further comprising:
if the fault detection operation is not available, adding a new measurement to the set of measurements; and
repeating said determining whether the fault detection operation is available.

28. A satellite positioning system receiver as recited in claim 27, wherein said determining whether the fault detection operation is available is based on the set of measurements.

29. A satellite positioning system receiver as recited in claim 27, wherein the set of measurements comprises a plurality of satellite measurements.

30. A satellite positioning system receiver as recited in claim 29, wherein the new measurement is not a satellite measurement.

31. A satellite positioning system receiver as recited in claim 25, wherein the fault is in one of a set of measurements used by the receiver to compute a position, the method further comprising:
if the fault exclusion operation is not available, adding a new measurement to the set of measurements; and
repeating said determining whether the fault exclusion operation is available.

32. A satellite positioning system receiver as recited in claim 31, wherein said determining whether the fault exclusion operation is available is based on the set of measurements.

33. A satellite positioning system receiver as recited in claim 31, wherein the set of measurements comprises a plurality of satellite measurements.

34. A satellite positioning system receiver as recited in claim 33, wherein the new measurement is not a satellite measurement.

35. A satellite positioning system receiver comprising:
means for receiving a plurality of signals, each from a different one of a plurality of satellites;
means for generating a set of measurements based on the plurality of signals;
means for performing a fault detection process, the fault detection process including
periodically determining whether a fault detection operation is available at a first rate, and
if the fault detection operation is available, periodically attempting to detect a fault in one of the measurements at a second rate higher than the first rate; and
means for performing a fault exclusion process, the fault exclusion process including
determining whether a fault exclusion operation is available in response to a fault being detected, and
attempting to exclude the fault if the fault exclusion operation is available.

36. A satellite positioning system receiver as recited in claim 35, further comprising, means for adding a new measurement to the set of measurements if the fault detection operation is not available and then repeating said determining whether the fault detection operation is available, wherein the new measurement is not a satellite measurement.

37. A satellite positioning system receiver as recited in claim 35, further comprising, means for adding a new measurement to the set of measurements if the fault exclusion operation is not available, and then repeating said determining whether the fault exclusion operation is available, wherein the new measurement is not a satellite measurement.

38. A satellite positioning system receiver as recited in claim 35, further comprising means for adding a new measurement to the set of measurements if either the fault detection operation or the fault exclusion operation is not available, wherein the new measurement is not a satellite measurement.

39. A satellite positioning system receiver as recited in claim 35, wherein said determining whether the fault exclusion operation is available is performed at a rate equal to or approximately equal to the first rate.

* * * * *